No. 12,021. Reissued Aug. 19, 1902.

G. DAHLBERG, J. CLICQUENNOI & E. UHLIN.

GAS AND STEAM CONVERTIBLE ENGINE.

(Application filed Aug. 7, 1901.)

2 Sheets—Sheet 1.

WITNESSES.

J. R. Keller.

Olive T. Armstrong

INVENTORS.

Gustave Dahlberg
Jules Clicquennoi and
Ernest Uhlin
by W. H. Dodge & Son
attorneys.

No. 12,021. Reissued Aug. 19, 1902.

G. DAHLBERG, J. CLICQUENNOI & E. UHLIN.

GAS AND STEAM CONVERTIBLE ENGINE.

(Application filed Aug. 7, 1901.)

2 Sheets—Sheet 2.

WITNESSES.

J. R. Keller

Elise T. Armstrong

INVENTORS.

Gustave Dahlberg
Jacob Clicquennoi and
Ernest Uhlin
by W. H. Dodge & Son
Attorneys.

UNITED STATES PATENT OFFICE.

GUSTAVE DAHLBERG, OF McDONALD, JACOB CLICQUENNOI, OF TAYLORSTOWN, AND ERNEST UHLIN, OF McDONALD, PENNSYLVANIA, ASSIGNORS, BY DIRECT AND MESNE ASSIGNMENTS, TO D. C. & U. GAS ENGINE COMPANY, OF WASHINGTON COUNTY, PENNSYLVANIA.

GAS AND STEAM CONVERTIBLE ENGINE.

SPECIFICATION forming part of Reissued Letters Patent No. 12,021, dated August 19, 1902.

Original No. 633,338, dated September 19, 1899. Application for reissue filed August 7, 1901. Serial No. 71,279.

*To all whom it may concern:*

Be it known that we, GUSTAVE DAHLBERG, of McDonald, JACOB CLICQUENNOI, of Taylorstown, and ERNEST UHLIN, of McDonald, in the county of Washington and State of Pennsylvania, citizens of the Unit States, have invented Improvements in as and Steam Convertible Engines, of which the following is a specification.

Our invention relates to a new and improved engine, and more particularly to a convertible engine having a single cylinder in which either steam or an explosive mixture may be employed for running the engine.

To this end our invention consists of a new and improved convertible engine, in a convertible double-acting steam-engine and a two-cycle explosive-engine, in an engine provided with a cylinder having a piston therein, a steam-chest, and ports, passage, and other parts for serving as a steam-engine, and having passages for an explosive mixture from one side of the piston to the other side through the steam-chest, whereby the steam-chest is utilized as the compression-chamber for the explosive mixture, and in the construction and combination of parts, all as hereinafter set forth and claimed.

So far as we are aware we are the first to introduce an explosive mixture into the steam-chest of an engine and to utilize the steam-chest as a compression-chamber for the explosive mixture.

Another object of our invention is to provide a construction that permits us to do away with compression and explosion chambers within the ends of the cylinder. Consequently when using steam very little steam is wasted, as would be the case were compression and explosion chambers employed in the ends of the cylinders.

Figure 1:
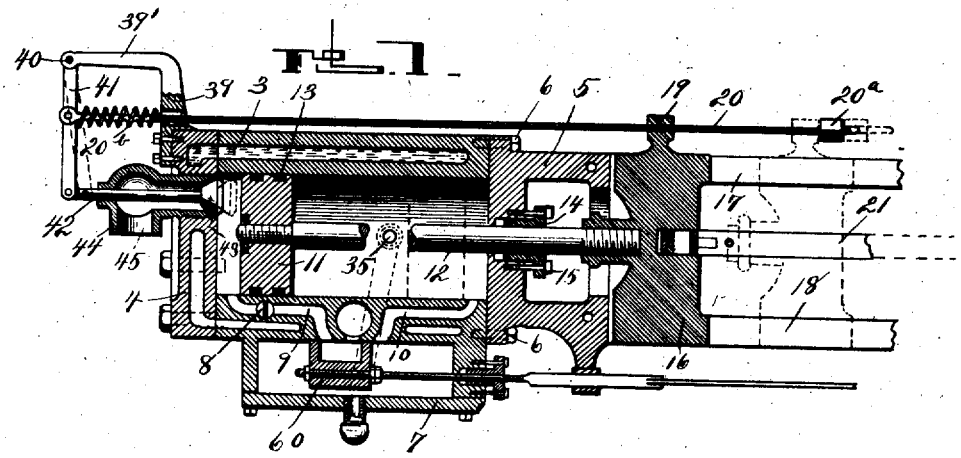
Figure 6:
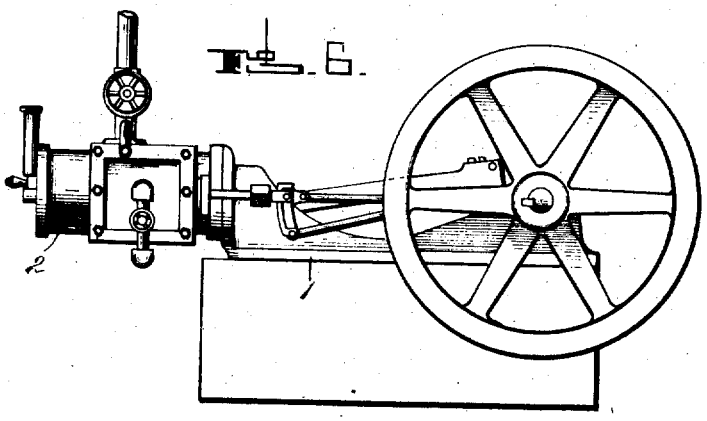
Figure 2:
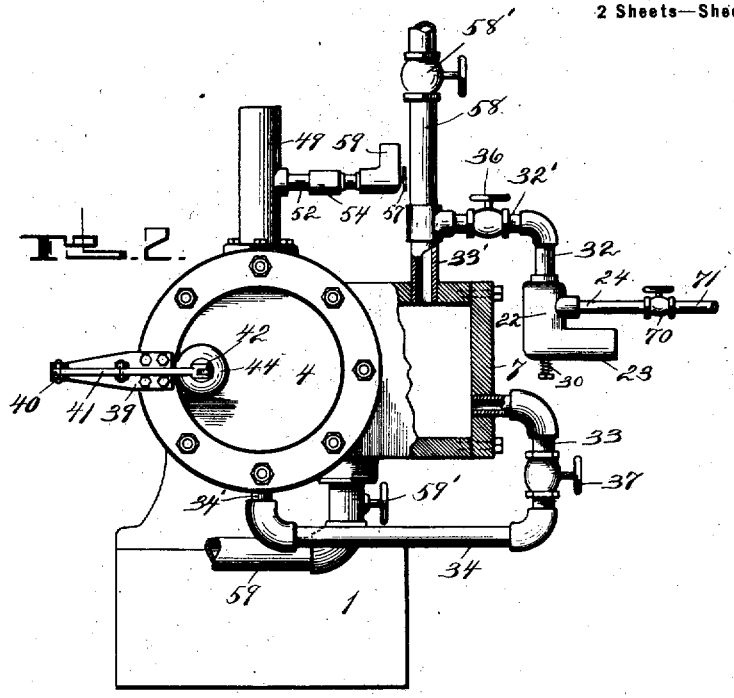
Figure 3:
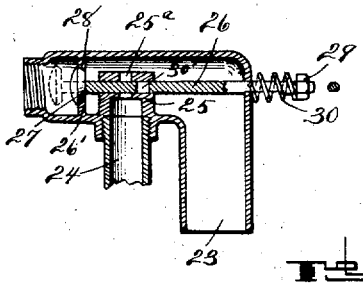
Figure 4:
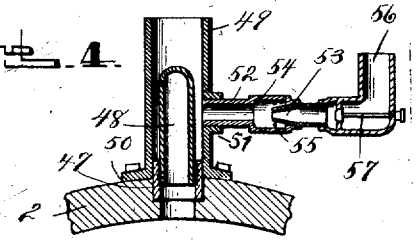
Figure 5:
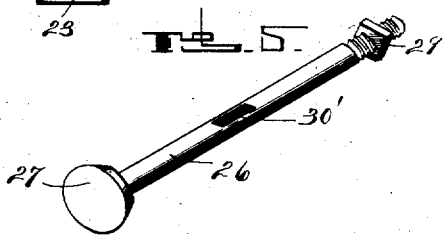

In the accompanying drawings, which illustrate an application of our invention, Figure 1 is a longitudinal sectional view of part of our engine, showing some parts in elevation; Fig. 2, a front elevational view; Fig. 3, a sectional detail view of gas and air mixer; Fig. 4, a vertical sectional view of the igniter mechanism; Fig. 5, a perspective view of the valve and stem of the gas and air mixer, and Fig. 6 a side elevational view of an engine embodying our invention.

Referring to the drawings, 1 is the bedplate or part of the frame of the engine to which the cylinder 2 is attached. Surrounding the cylinder is a water-jacket 3. The combustion-chamber end of the cylinder is closed by a suitable head 4 and the other end by a head 5, which latter is preferably a part of the engine-frame. As illustrated, these heads are secured to the cylinder by screw-bolts 6. Formed integral with or suitably attached to the cylinder is a steam and explosive-mixture chest 7, provided with passages 9 and 10, through which steam or an explosive mixture passes from the chest 7 to the interior of the cylinder. The passage 9 has arranged therein a suitable cut-off 8, which is opened to allow steam to pass through the passage into the cylinder when the engine is driven by steam. When running the engine with steam, the passages 9 and 10 are employed in the usual and well known manner.

Important and characteristic features of the present invention are the manner of introducing the explosive mixture to the cylinder, compressing the explosive mixture, and introducing the compressed explosive mixture to the combustion end of the cylinder. In carrying out these ends the chest 7 forms a very important part, as will be fully hereinafter described. The passage 10 allows the explosive mixture compressed by the forward stroke of the piston, or the stroke of the piston in the direction of the head 5, to pass therethrough into the chest, after which the mixture is forced into the cylinder through suitable pipe connections leading from the chest to the cylinder. When an explosive mixture is used for operating the engine, the cut-off 8 is always closed.

Operating in the cylinder 2 is a piston 11, which is suitably connected to a piston-rod 12 and is provided on its periphery with packing-rings 13. The head 5 is provided with a stuffing-box or gland 14, through which the piston operates. This stuffing-box is secured to the head by bolts 15. The outer end of the piston-rod 12 is suitably connected to a cross-head 16. This cross-head travels upon guides 17 and 18. The cross-head 16 is provided with an apertured extension 19, adapted to support a rod 20 and to be brought in contact with a nut or collar 20[a], located at one end of the rod.

21 indicates a pitman, which is suitably connected at one end to the cross-head and at its opposite end to a crank-shaft (not shown) of the mechanism desired to be operated by the engine.

22 is a gas and air mixer having an air-inlet 23 and a gas-inlet 24. Formed integral with an inner face of the mixer is a projection or support 25, provided with an opening in which a valve-stem 26 is supported and moves. It is also provided with a port 25[a], through which gas passes when the port 30′ of the stem 26 registers therewith. One end of the valve-stem connects with a valve 27, having its seat 28 formed in a partition 26′. The other end of the stem extends through the wall of the air-passage 23 and has a nut 29 secured thereto. Surrounding the stem and interposed between the nut 29 and the outside of the wall of the air-inlet 23 is a coiled spring 30, which is under such a compression as to normally keep the valve 27 on its seat 28. The explosive mixture passes from the mixer 22 to the chest 7 by way of pipes 32, 32′, and 33′ and from the chest to the interior of the cylinder through pipes 33, 34, and 34′. A cut-off 36 in the pipe connection 32 controls the admission of the explosive mixture to the chest 7, and 37 is a similar cut-off arranged in the pipe connection 33 for controlling the admission of explosive mixture to the cylinder. An inlet-port 35 in the cylinder registers with the end of the pipe connection 34′. An outwardly-projecting arm 39, having an extension 39′, is secured to the head 4 of the cylinder and forms a support for the rod 20 and for the lever 41, which latter at one end is pivotally joined to the extension 39′ at 40 and to a valve-stem 42 of the exhaust-valve 43 at its other end.

44 is a hollow casting having a screw-threaded portion adapted to be screwed into an opening in the cylinder-head. The object of this casting is to provide a seat for the exhaust-valve 43 and a support and guide for the valve-stem 42. It is open to the atmosphere, as shown at 45, for the immediate escape of the exploded gases after they pass the valve 43. Valve 43 is operated by rod 20, which is connected to the arm or lever 41, as clearly shown by Fig. 1. A coiled spring 20[b] surrounds that portion of the rod 20 between the arm 39 and the lever 41 and is for the purpose of keeping the valve normally on its seat. The operation of this valve will be fully hereinafter described.

The top of the cylinder is provided with an opening 46, the upper end thereof being of greater diameter, and mounted in this enlarged upper end is a collar 47, which is interiorly screw-threaded and is adapted to receive the screw-threaded lower end of the igniter-tube 48. The tube 48 is surrounded by the upwardly-extending sleeve 49, which is secured in position by means of the annular flange formed integral with its lower end, the flange being secured to the cylinder, as at 50. The sleeve 49 is also provided with an annular flange 51, which is adapted to receive one end of the pipe 52 for guiding the flame from the burner 53 to the igniter-tube. The opposite end of the pipe is enlarged, as at 54, which is provided with a series of apertures 55 for the admission of air for supporting combustion. The burner 53 is connected to a suitable gas-supply pipe 56, which has arranged therein a cut-off 57 for regulating the flow of gas to the burner.

Steam is introduced to the chest 7 through pipe 33′, which latter is connected with a steam-pipe 58, having a suitable valve 58′. The steam-exhaust is effected through a pipe 59, provided with a valve 59′.

60 indicates an ordinary slide-valve, which is arranged in the chest 7 and operates in the usual manner.

In describing the operation of our engine we will designate the end of the cylinder nearest the head 5 the "front" end and the other the "back" end of the cylinder, and the stroke of the piston from the back end toward the front as the "forward" stroke and the opposite stroke the "backward" stroke. When operating the engine with steam, the slide-valve 60 and its stem are connected with an eccentric-rod in the usual manner. Prior to admitting steam to the chest 7 cut-off valve 8, as well as the steam-exhaust valve 59′, is opened and the valves 36 and 37 closed. Steam is then admitted to the chest through pipe 33′ by opening valve 58′, and the operation is that of an ordinary slide-valve steam-engine. The rod 20 may be disconnected. This, however, is not necessary, as the opening of the valve 43, caused by the action of the cross-head arm and the rod 20, will not affect the running of the engine. When used as a gas-engine, the cut-off 8 is closed, as shown by Fig. 1, and the stem of valve 60 disconnected from the eccentric-rod and the valve 60 placed in the position it occupies in Fig. 1. This will permit of a free passage of the explosive mixture from the chest to the front end of the cylinder and from the cylinder back into the chest 7 through passage 10. Before opening the valves 36 and 37 the valves 58′ and 59′ should be closed. After connecting the rod 20, if the same has been disconnected, open the valve 70 of the gas-supply pipe 71 and the valves 36 and 37, respectively controlling the passage of the explosive mixture from the mixer 22 to the chest 7 and the passage from the chest 7 to the cylinder, and place the piston in the position shown in dotted lines in Fig. 1. The position of the piston as shown by the dotted lines represents the extreme limit of the forward stroke. The valves controlling the passage of the explosive mixture to the chest being opened permits the mixture to enter the chest through pipe 33'. A movement of the piston from the position shown by dotted lines toward the rear end of the cylinder creates a partial vacuum in the chest 7 and permits the atmospheric pressure upon the under side of valve 27 to force the valve from its seat and provide a free passage for air to enter the chest. This movement of the valve 27 and its stem 26 causes the opening 30' in stem 26 to register with the port 25[a] of the support 25 and allows the gas from the inlet-passage 24 to mix with the air and enter the chest therewith, thereby filling the chest and the front end of the cylinder with the explosive mixture. When the piston has completed its backward stroke and starts on its forward stroke, the pressure of the explosive mixture within the chest and the atmospheric pressure are equalized, and the spring 30, which is under greater compression while valve 27 is raised from its seat than it is while the valve is on its seat, closes the valve and prevents the explosive mixture in the chest from escaping therefrom back into the mixer. As the piston continues on its forward stroke the volume of the explosive mixture continually decreases until the piston reaches the end of its travel on this stroke, at which time the entire charge of the explosive mixture is compressed within the chest 7. Just as the piston reaches the end of its travel it uncovers the inlet-port 35, and the compressed explosive mixture passes from the chest into the rear end of the cylinder by way of the pipes 33, 34, and 34'. Immediately upon the start of the piston upon its next backward stroke it covers the inlet-port 35, and the explosive charge just admitted to the back end of the cylinder is confined therein. As the piston continues its backward stroke the charge is further compressed and finally ignited by the hot tube in the usual and well-known manner. The resulting explosion causes the piston to make another forward stroke. It is of course understood that during the last-described backward stroke of the piston a fresh explosive charge is being drawn into the chest 7 in the manner heretofore described. As the piston nears the end of the stroke caused by the explosion and before it uncovers the inlet-port 35 the extension 19 of the cross-head 16 will be brought in contact with the adjustable collar 20[a] on the rod 20 and cause the rod 20 and the intermediate mechanism to be moved so as to open the exhaust-valve 43, allowing the exploded charge to pass into the casing 44 and from thence into the atmosphere. Immediately following the opening of the exhaust-valve and before it is closed the piston again uncovers the inlet-port 35 and a fresh charge of the explosive mixture, compressed in the chest 7 by this last forward stroke of the piston, is admitted to the back or combustion end of the cylinder and expels through the exhaust-valve the exploded gases that may still be in the cylinder. Upon the beginning of the next backward stroke of the piston the inlet 35 is again closed, and the extension 19 is moved away from the collar 20[a], and the action of the spring 20[b] closes the exhaust-valve 43, thereby confining the last-admitted compressed explosive charge to the combustion end of the cylinder. The engine being running the operations described are repeated.

The construction herein described and shown presents a simple and efficient convertible engine in which either steam or an explosive mixture may be employed for operating the engine and in which the chest 7 is utilized for the compression-chamber when gas is used and for a receiving-chamber for both gas and steam.

Having thus described our invention, what we claim is—

1. In a convertible engine, the combination, with a cylinder having a piston therein, of a steam-chest or fluid-chamber in communication with the cylinder, means for introducing and compressing an explosive mixture in the chest, and a passage for the compressed explosive mixture leading from the chest to the cylinder, substantially as set forth.

2. In a convertible engine, the combination, with a cylinder having a piston therein, of a steam-chest, steam-passages leading from the chest to opposite ends of the cylinder one of which is provided with a valve for closing the passage, said chest also provided with an inlet explosive-mixture passage, and with an outlet explosive-mixture passage leading to the cylinder, said passages arranged in conjunction with the piston and the steam-passages to permit an explosive charge to be drawn into the chest, compressed therein and the compressed explosive charge passed to the combustion end of the cylinder, substantially as set forth.

3. In a convertible engine, the combination, with a cylinder having a piston therein, of a steam-chest in communication with the cylinder adapted to receive an explosive mixture, a passage for the explosive mixture from the chest to one end of the cylinder, an inlet-port in the cylinder for admitting a compressed explosive charge, and a passage from the chest to the inlet-port, substantially as set forth.

4. In a convertible engine, the combination, with a cylinder having a piston therein, of a steam-chest in communication with the cylinder adapted to receive an explosive mixture, a gas-mixer provided with a valve, a connection between the mixer and the chest for the passage of an explosive mixture, a passage from the interior of the chest to one end of the cylinder, an inlet-port in the cylinder for admitting a compressed explosive charge, and a passage from the chest to the inlet-port, substantially as set forth.

5. In a convertible engine, the combination, with a cylinder having a piston therein, a steam-chest in communication with the cylinder by steam-passages leading from the chest to opposite ends of the cylinder, a valve located in one of the passages, means for admitting an explosive mixture to the chest, an inlet-port in the cylinder for the admission of a compressed explosive charge, a pipe connecting the chest with the inlet-port, said connecting-pipe and one of the steam-passages forming an explosive-mixture passage from one side of the piston to the other through the chest, substantially as set forth.

In testimony whereof we affix our signatures in the presence of witnesses.

GUSTAVE DAHLBERG.
JACOB CLICQUENNOI.
ERNEST UHLIN.

Witnesses as to the signature of Gustave Dahlberg:

E. J. REED,
A. J. ANDERSON.

Witnesses as to the signatures of Jacob Clicquennoi and Ernest Uhlin:

CORNELIUS CURRAN,
CHAS. CURRAN.